United States Patent
Kazmi et al.

(10) Patent No.: US 10,841,051 B2
(45) Date of Patent: Nov. 17, 2020

(54) METHODS AND APPARATUSES FOR ADAPTING SERVING CELL INTERRUPTION BASED ON NUMEROLOGY

(71) Applicant: TELEFONAKTIEBOLAGET LM ERICSSON (PUBL), Stockholm (SE)

(72) Inventors: Muhammad Kazmi, Sundbyberg (SE); Iana Siomina, Täby (SE)

(73) Assignee: TELEFONAKTIEBOLAGET LM ERICSSON (PUBL), Stockholm (SE)

(*) Notice: Subject to any disclaimer, the term of this patent is extended or adjusted under 35 U.S.C. 154(b) by 9 days.

(21) Appl. No.: 16/334,041

(22) PCT Filed: Sep. 26, 2017

(86) PCT No.: PCT/SE2017/050935
§ 371 (c)(1),
(2) Date: Mar. 18, 2019

(87) PCT Pub. No.: WO2018/063062
PCT Pub. Date: Apr. 5, 2018

(65) Prior Publication Data
US 2019/0273584 A1     Sep. 5, 2019

Related U.S. Application Data

(60) Provisional application No. 62/402,093, filed on Sep. 30, 2016.

(51) Int. Cl.
*H04L 5/00* (2006.01)
*H04B 7/26* (2006.01)
*H04L 27/26* (2006.01)

(52) U.S. Cl.
CPC ............. *H04L 5/0007* (2013.01); *H04B 7/26* (2013.01); *H04L 5/0035* (2013.01); *H04L 27/2666* (2013.01)

(58) Field of Classification Search
CPC ..... H04L 5/0007; H04L 5/003; H04L 5/0032; H04L 5/0035; H04L 27/2666; H04B 7/24; H04B 7/26
See application file for complete search history.

(56) References Cited

U.S. PATENT DOCUMENTS

| | | | |
|---|---|---|---|
| 8,665,697 B1* | 3/2014 | Venugopalan | H04J 11/005 370/208 |
| 10,326,566 B2* | 6/2019 | Ko | H04L 5/0044 |

(Continued)

FOREIGN PATENT DOCUMENTS

| EP | 3417563 A1 | 12/2018 |
|---|---|---|
| WO | 2008049028 A1 | 4/2008 |

(Continued)

OTHER PUBLICATIONS

Ericsson, Nokia, Intel; "Way forward for NR RRM"; 3GPP TSG-RAN Meeting #80; R4-166735; Aug. 22-26, 2016; 1 page; Gothenberg, Sweden.

(Continued)

*Primary Examiner* — Kevin D Mew
(74) *Attorney, Agent, or Firm* — Patent Portfolio Builders, PLLC

(57) ABSTRACT

Methods, systems and devices for communicating via signaling are described. The system or device determines at least one first numerology and at least one second numerology used for communicating radio signals in a first cell and a second cell, respectively, wherein the at least one first numerology and the at least one second numerology include one or more parameters which define the radio signals in terms of time and frequency. The system or device obtains, based on at least one of the numerologies, a threshold related to at least one signal interruption performance metric. The (Continued)

system or device monitors or maintains a signal interruption performance on the first cell relative to the threshold.

18 Claims, 10 Drawing Sheets

(56) References Cited

U.S. PATENT DOCUMENTS

| | | | | |
|---|---|---|---|---|
| 2008/0117833 | A1* | 5/2008 | Borran | H04W 72/082 370/252 |
| 2014/0126403 | A1* | 5/2014 | Siomina | H04J 11/005 370/252 |
| 2015/0180622 | A1 | 6/2015 | Yoo et al. | |
| 2018/0049064 | A1* | 2/2018 | Li | H04W 24/02 |
| 2018/0092086 | A1* | 3/2018 | Nammi | H04L 5/003 |
| 2018/0192426 | A1* | 7/2018 | Ryoo | H04W 74/0833 |
| 2018/0317212 | A1* | 11/2018 | Kazmi | H04W 72/042 |
| 2019/0081832 | A1* | 3/2019 | Marinier | H04L 5/0053 |
| 2019/0181998 | A1* | 6/2019 | Peng | H04L 5/0044 |
| 2019/0207697 | A1* | 7/2019 | Ghasemzadeh | H04L 27/2602 |
| 2019/0245649 | A1* | 8/2019 | Siomina | H04B 17/104 |
| 2020/0059894 | A1* | 2/2020 | Siomina | H04L 5/001 |

FOREIGN PATENT DOCUMENTS

| | | |
|---|---|---|
| WO | 2015147733 A1 | 10/2015 |
| WO | 2015147736 A1 | 10/2015 |
| WO | 2017005295 A1 | 1/2017 |
| WO | 2017079530 A1 | 5/2017 |
| WO | 2017142454 A1 | 8/2017 |
| WO | 2017188733 A1 | 11/2017 |
| WO | 2017196246 A3 | 12/2017 |

OTHER PUBLICATIONS

Extended European Search Report in corresponding/related European Application No. EP 17 85 6908 dated Apr. 7, 2020.
3GPP TS 36.331 V13.2.0 (Jun. 2016), "3rd Generation Partnership Project; Technical Specification Group Radio Acces Network; Evolved Universal Terrestrial Radio Access (E-UTRA); Radio Resource Control (RRC); Protocol specification (Release 13)", Jun. 2016, pp. 1-623.
Preben Mogensen et al., "5G small cell optimized radio design", Globecom 2013 Workshop—Emerging Technologies for LTE-Advanced and Beyond-4G, 2013, pp. 111-116.
International Search Report and Written Opinion, dated Dec. 8, 2017, from corresponding/related International Application No. PCT/SE2017/050935.

* cited by examiner

METHODS AND APPARATUSES FOR ADAPTING SERVING CELL INTERRUPTION BASED ON NUMEROLOGY

RELATED APPLICATION

The present application is related to, and claims priority from, U.S. Provisional Patent Application No. 62/402,093, entitled "Methods and Apparatuses for Adapting Serving Cell Interruption Based on Numerology", to Muhammad Kazmi and lana Siomina, filed Sep. 30, 2016, the entire disclosure of which is incorporated here by reference.

TECHNICAL FIELD

The present invention generally relates to radiocommunications and more specifically, to radiocommunication systems, devices and methods which adapt serving cell interruptions based on numerology.

BACKGROUND

Work is ongoing to establish requirements for, and then to standardize, next generation (5G) radiocommunication systems including a new radio access technology (referred to herein as "NR") which is seen as an evolution from the 4G radio access technology (i.e., Long Term Evolution (LTE)). So-called "tight integration" is a phrase used to convey technological concepts being developed to fulfill 5G user requirements, such as very high data rates by user plane aggregation or ultra-reliability by user or control plane diversity. User plane aggregation is particularly efficient if NR and LTE offer similar throughput for a particular user so that the aggregation can roughly double the throughput. The occurrence of these cases will depend on the allocated spectrum, the coverage and the load of the two accesses. Ultra-reliability can be mandatory for some critical applications for which reliability and low latency are crucial to maintain.

In addition to these developing radiocommunication aspects, tight integration also provides enhancements to existing multiple radio access technologies (multi-RAT) features (such as load balancing and service continuity) due to a radio access network (RAN) level integration transparent to the core network (CN) (less signaling). Service continuity, in particular, will be important in early deployments since it can be expected that early NR deployments will consist of radio coverage "islands" within a wider, already-deployed LTE network coverage.

Among other things, the interfaces and interactions between the nodes in legacy radiocommunication systems like LTE and the nodes in NR systems are under consideration. FIG. 1 illustrates such nodes with both currently existing and potential new interfaces therebetween. For example, LTE's core network (Evolved Packet Core or (EPC)) 100 and an LTE base station (eNode B or eNB) 102 currently have an S1 interface which interconnects them for the communication of data, but as yet it is unclear if there will be an interface between the EPC 100 and an NR base station 104 (gNode B or gNB). Likewise discussion is ongoing regarding probable interfaces between the NR core 106 and both eNB 108 and gNB 110 (depicted as interface NG1) and interfaces between the eNBs and gNBs (depicted as "X2 like" interfaces), but it is unclear if an interface will be established for communications between the two different core networks 100 and 106.

The network scenarios for deployment of LTE and NR may be very diverse in terms of coverage and co-location. In terms of deployments, LTE and NR can be co-located 200 as shown in FIG. 2(a) or non co-located 202 as shown in FIG. 2(b). In addition to base station deployment, core network deployment may also vary, e.g., the core network could be centralized 204 as shown in FIG. 2(c) or shared 206 as shown in FIG. 2(d).

Further complexities arise as such radiocommunication systems support, or will support, multicarrier techniques including carrier aggregation (CA) and dual connectivity (DC) and may involve carriers in licensed and/or unlicensed spectrum. In CA the terminal is configured with a primary carrier component (CC) (or cell or serving cell) which is referred to as the Primary Cell or PCell. The PCell is particularly important, e.g., since control signaling is transmitted on this cell and also since the UE performs monitoring of the radio quality on the PCell. A CA capable terminal can also be configured with additional carriers (or cells or serving cells) which are referred to as Secondary Cells (SCells).

In dual connectivity (DC), a user equipment (UE) in the RRC_CONNECTED state is configured with a Master Cell Group (MCG) and a Secondary Cell Group (SCG). A Cell Group (CG) is a group of serving cells associated with either the Master eNB (MeNB) or the Secondary eNB (SeNB), respectively. The MCG and SCG are defined as follows: the Master Cell Group (MCG) is a group of serving cells associated with the MeNB, including the PCell and optionally one or more SCells; the Secondary Cell Group (SCG) is a group of serving cells associated with the SeNB including the Primary SCell (pSCell) and optionally one or more SCells. The serving cell management is performed by means of Medium Access Control (MAC) commands to control (de)configuration of SCell(s) (aka SCell addition), (de)activation of SCell(s), setting up and releasing PSCell in DC. The PCell is always activated, while the SCell can be activated or deactivated.

Certain operations which are performed in multicarrier radiocommunication systems may cause an interruption of signals operating on one or more of its serving cells. For example when a UE performs one or more operations on another cell, which may or may not be the serving cell of the UE, those operations may interrupt signaling on one or more of that UE's serving cells. Some examples of operations causing interruption on serving cell(s) of the UE are described below.

For example, interruptions can occur when a UE executes a setup or release procedure on one of its SCells. A multi-carrier serving cell setup herein refers to a procedure which enables the network node to at least temporarily setup or release a secondary serving cell at the UE for multi-carrier operation, e.g., the use of an SCell in a CA capable UE, the use of a PSCell in dual connectivity (DC), etc. The serving setup or release procedure or command can perform, for example any one or more of: configuration of SCell(s) aka SCell addition, de-configuration of SCell(s) aka SCell release, activation of SCell(s), deactivation of SCell(s), setting up of PSCell in dual connectivity, and/or release of PSCell in dual connectivity.

A SCell setup or release (i.e. when SCell is configured, de-configured, activated or deactivated) may cause an interruption of the UE's operation on the PCell or any other activated SCell. The UE's operation in this context means reception and/or transmission on signals. The interruption in uplink (UL) transmissions and/or downlink (DL) receptions typically occurs when a UE has single radio chain to receive and/or transmit more than one CC. However the interruption may even occur when a UE has independent radio transmit and/or receive chains on the same chip. The interruption typically occurs when the carrier aggregation (CA) capable UE changes its reception and/or transmission bandwidth (BW) from single-carrier to multiple-carrier operation or vice versa. In order to change the BW, the UE has to reconfigure its radio frequency (RF) components in the RF chain e.g., RF filter, power amplifier (PA), etc. The interruption period can vary from between, for example, 2-5 ms. The interruption is caused due to several factors including RF tuning to reconfigure BW (i.e. to shorten or lengthen the BW), setting or adjusting of one or more radio parameters such as the automatic gain control (AGC) setting, etc.

In an existing solution an interruption on a PCell of up to 5 subframes is allowed for intra-band CA when any of the SCell setup or release procedure is executed by the UE. However an interruption on PCell of up to 1 subframe is allowed for inter-band CA when any of the SCell setup or release procedure is executed by the UE. When multiple SCCs are configured then this requirement extends to the PCell and any activated SCell.

During the interruption period the UE cannot receive from and/or transmit any signal or information to the network. During the interruption period the UE also cannot perform measurements due to its inability to receive and/or transmit signals. This leads to the loss or dropping of packets transmitted between the UE and its serving cell(s). It should be noted that the interruption may impact several or all active carriers, and may affect both the uplink and downlink.

Other UE operations may also cause such interruptions, for example the UE's performance of measurements. The UE may perform measurements on a deactivated SCell or other cells on the Secondary Component Carrier (SCC) with a deactivated SCell. In this case, the measurements are performed in measurement cycles configured by higher layers. The Positioning Reference Signals (PRS) configuration for Reference Signal Time Difference (RSTD) and SCell measurement cycle used for mobility measurements (e.g. Reference Signal Received Power (RSRP) and Reference Signal Received Quality (RSRQ) measurements) are examples of such measurement cycles. The SCell measurement cycles may have periodicity of 160 ms, 320 ms, 640 ms or 1024 ms. The maximum time of a measurement within each measurement cycle is currently not restricted by the 3GPP standards, but in practice it is likely to be up to 6 subframes in each cycle.

When performing measurement on cells of the SCC with deactivated SCell(s) without gaps the UE typically retunes its receiver. These cells may be an SCell and/or one or more neighbor cells of that SCC. Therefore the interruption in DL and/or UL of a UE's serving cell occurs before and after each measurement sample i.e. when the bandwidth is extended (e.g. from 20 MHz to 40 MHz) and also when it is reverted back to the BW of the serving carriers (e.g. from 40 MHz to 20 MHz) as shown in FIG. 3. The interruption may also occur even when the serving carrier and SCC are received using the same hardware, i.e., the same receive chain, due to tuning. The interruption in each direction in this case can be between 2-5 ms since the UE has to retune the center frequency and the bandwidth of the downlink. The UE does measurements on cells of SCC with deactivated SCell(s) on a regular basis according to the SCell measurement cycle configured by the eNB.

The current requirement on the maximum allowed interruptions due to measurements on an SCC with a deactivated SCell is up to 0.5% probability of missed ACK/NACK messages when the configured measCycleSCell parameter [as specified in standards document 3GPP TS 36.331] is 640 ms or longer. Furthermore, when multiple SCCs are configured, there is also a requirement that an interruption on any activated SCell should not exceed 0.5% probability of missed ACK/NACK messages when the configured measCycleSCell parameter for the deactivated SCell is 640 ms or longer.

In LTE systems these interruptions have been identified and controlled as described above to minimize performance issues. However in LTE this has been possible, at least in part, because the numerology used so far in existing LTE RATs is rather static and typically can be derived by the UE, e.g., by one-to-one mapping to RAT, frequency band, service type (e.g., MBMS), etc. In this context, the term numerology refers to one or more parameters which define how radio signals are defined in terms of time and frequency. For example, for LTE the term "numerology" includes one or more of, e.g., the following elements: frame duration, subframe or transmission time interval (TTI) duration, slot duration, subcarrier spacing, number of subcarriers per RB, number of resource blocks (RBs) within the bandwidth (different numerologies may result in different numbers of RBs within the same bandwidth), cyclic prefix (CP).

By way of contrast in NR it is expected that different numerologies will be used more frequently. For example NR may use different time resources of the same link (multiplexed in time and/or frequency) or on different links involved in multicarrier operation. In multicarrier operation, the UE may cause interruption on one or more serving cells while performing one or one operations (e.g. activation/deactivation) on another serving cell. The serving cell interruption should be avoided or minimized. However the impact of different numerologies on interruption under multicarrier operation is undefined. This may degrade scheduling performance of signals in the UL and/or in DL of the serving cell of the UE. Due to undefined and unspecified serving interruption levels in multicarrier operation, the UE performance may be inconsistent leading to degradation of the serving cell performance. This may also lead to inappropriate outcome of the operation on one cell that causes interruption on the serving cell of the UE.

Accordingly, it would be desirable to provide methods, devices and systems which address the problems associated with interruptions of the serving cell in a radio system employing a number of numerologies.

SUMMARY

According to an embodiment, the user equipment (UE) determines at least one first numerology and at least one second numerology used for communicating radio signals in a first cell and a second cell, respectively. The at least one first numerology and the at least one second numerology include one or more parameters which define the radio signals in terms of time and frequency. The UE obtains a threshold related to at least one signal interruption performance metric based on at least one of the numerologies N1 and N2. The UE performs at least one operation on the second cell while monitoring, during the at least one operation, a signal interruption performance on the first cell (cell1) relative to the threshold.

According to another embodiment a user equipment (UE) includes a processor which is configured to determine at least one first numerology and at least one second numerology used for communicating radio signals in a first cell and a second cell, respectively. The at least one first numerology and the at least one second numerology include one or more parameters which define the radio signals in terms of time and frequency. The processor is further configured to obtain, based on at least one of the numerologies, a threshold related to at least one signal interruption performance metric. The UE also includes a transceiver which is configured to perform at least one operation on the second cell while monitoring, during the at least one operation, a signal interruption performance on the first cell relative to the threshold.

According to another embodiment, a network node determines at least one first numerology and at least one second numerology used for communicating radio signals in a first cell and a second cell, respectively. The at least one first numerology and the at least one second numerology include one or more parameters which define the radio signals in terms of time and frequency. The network node obtains, based on at least one of the numerologies, a threshold elated to at least one signal interruption performance metric. The network node adapts one or more operational tasks to maintain a signal interruption performance below the threshold.

According to another embodiment a network node includes a processor which is configured to determine at least one first numerology and at least one second numerology used for communicating radio signals in a first cell and a second cell, respectively. The at least one first numerology and the at least one second numerology include one or more parameters which define the radio signals in terms of time and frequency. The processor is configured to obtain, based on at least one of the numerologies, a threshold related to at least one signal interruption performance metric. The network node adapts one or more operational tasks to maintain a signal interruption performance below the threshold.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

Figure 1:
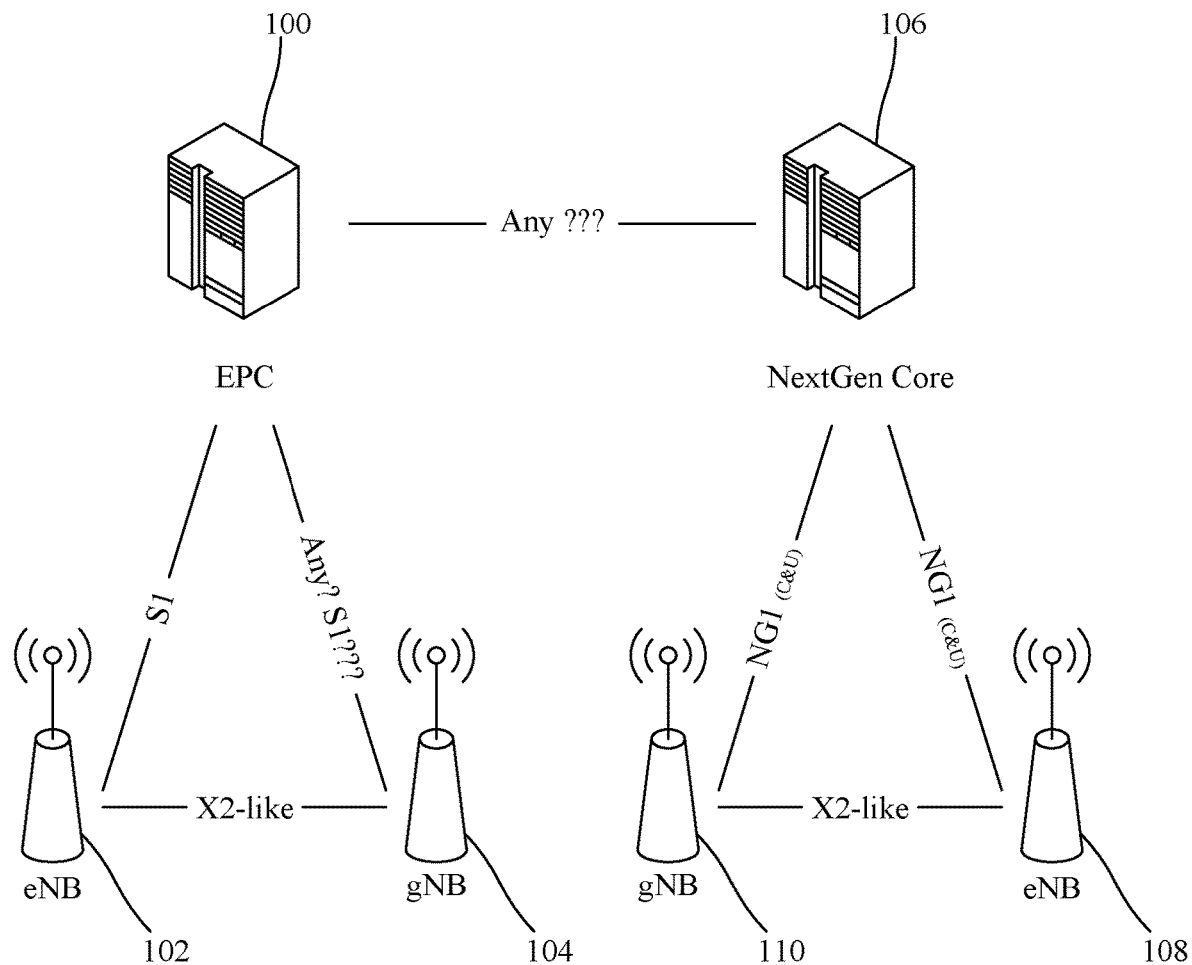
FIG. 1 illustrates various network interfaces associated with deployment of 5G radiocommunication systems.
Figure 2A:
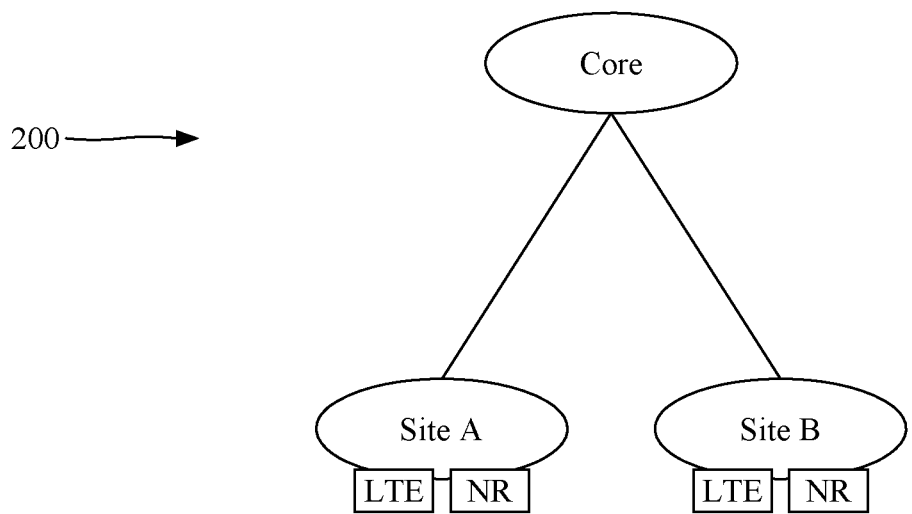
FIGS. 2(a)-2(d) illustrate various network scenarios associated with deployment of 5G radiocommunication systems.
Figure 2B:
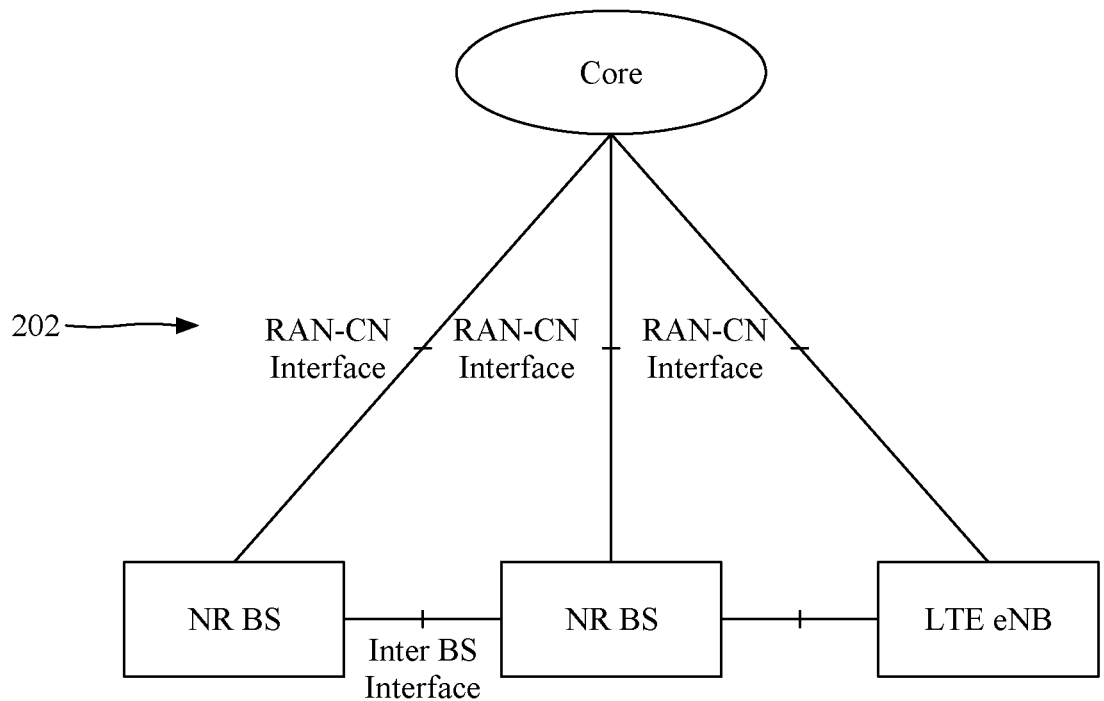
Figure 2C:
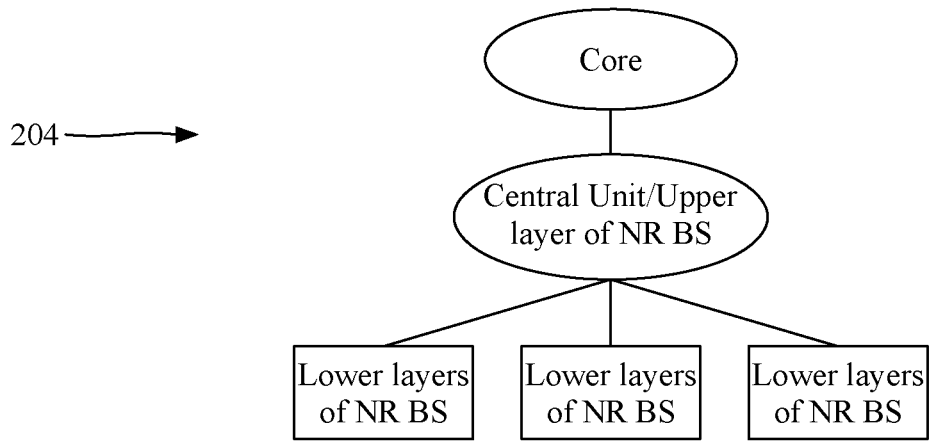
Figure 2D:
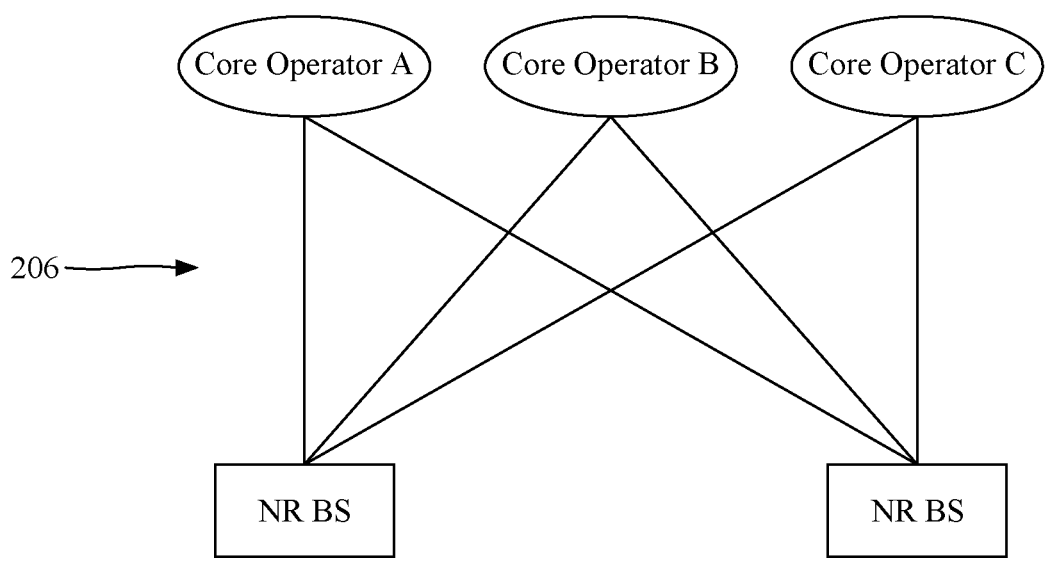
Figure 3:
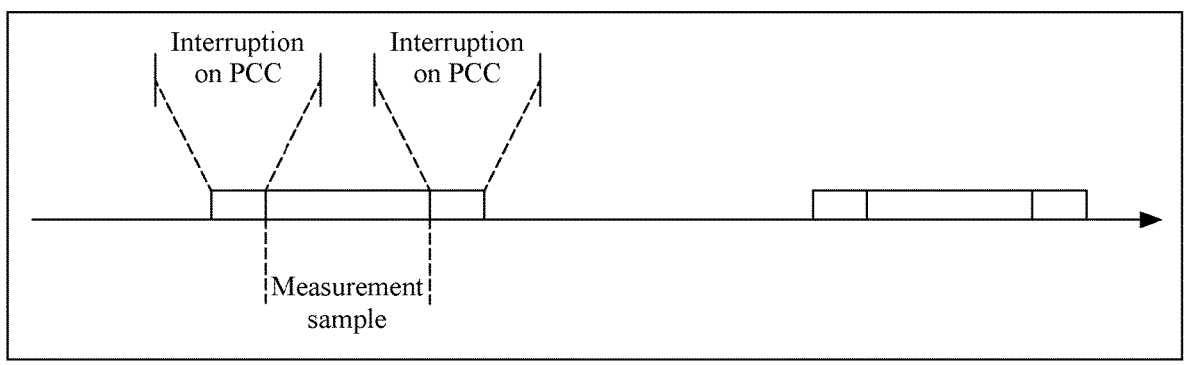
FIG. 3 depicts interruptions associated with measurements.

The following description of the embodiments refers to the accompanying drawings. The same reference numbers in different drawings identify the same or similar elements. The following detailed description does not limit the invention. Instead, the scope of the invention is defined by the appended claims. The embodiments to be discussed next are not limited to the configurations described below, but may be extended to other arrangements as discussed later.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

As described in the Background, it is anticipated that the different numerologies which will be present in next generation radiocommunication systems will result in undefined/uncontrolled interruptions in cell service for multicarrier capable UEs. Embodiments described herein provide for, among other things, numerology based serving cell interruption metrics which can be used to control performance of UE operations which cause signaling interruptions. As such the discussion will proceed initially with a more detailed discussion of numerology generally, followed by some additional terminology description and then various embodiments.

As mentioned earlier, for LTE the term "numerology" includes, e.g., the following elements: frame duration, subframe or TTI duration, slot duration, subcarrier spacing, number of subcarriers per RB, number of RBs within the bandwidth (different numerologies may result in different numbers of RBs within the same bandwidth). The exact values for the numerology elements in different radio access technologies are typically driven by performance targets, e.g., performance requirements impose constraints on usable subcarrier spacing sizes, e.g., the maximum acceptable phase noise and the slow decay of the spectrum (impacting filtering complexity and guardband sizes) set the minimum subcarrier bandwidth for a given carrier frequency, and the required cyclic prefix sets the maximum subcarrier bandwidth for a given carrier frequency.

However, also as mentioned above, the numerology used so far in the existing RATs is rather static and typically can be easily derived by the UE, e.g., by one-to-one mapping to RAT, frequency band, service type (e.g., MBMS), etc., since in LTE downlink which is OFDM-based, the subcarrier spacing is 15 kHz for normal CP and 15 kHz and 7.5 kHz (i.e., the reduced carrier spacing) for extended CP, where the latter is allowed only for MBMS-dedicated carriers. However, the support of multiple numerologies has been agreed for NR, which can be multiplexed in the frequency and/or time domain for the same or different UEs.

More specifically, in NR which is to be based on OFDM, multiple numerologies will be supported for general operation. A scaling approach (based on a scaling factor $2^n$, n=1, 2, . . . ) is considered for deriving subcarrier spacing candidates for NR: 15 kHz, 30 kHz, 60 kHz, etc. The numerology-specific subframe durations can then be determined in milliseconds (ms) based on the subcarrier spacing: subcarrier spacing of $(2^m*15)$kHz gives exactly $\frac{1}{2}m$ ms.

Figure 4:
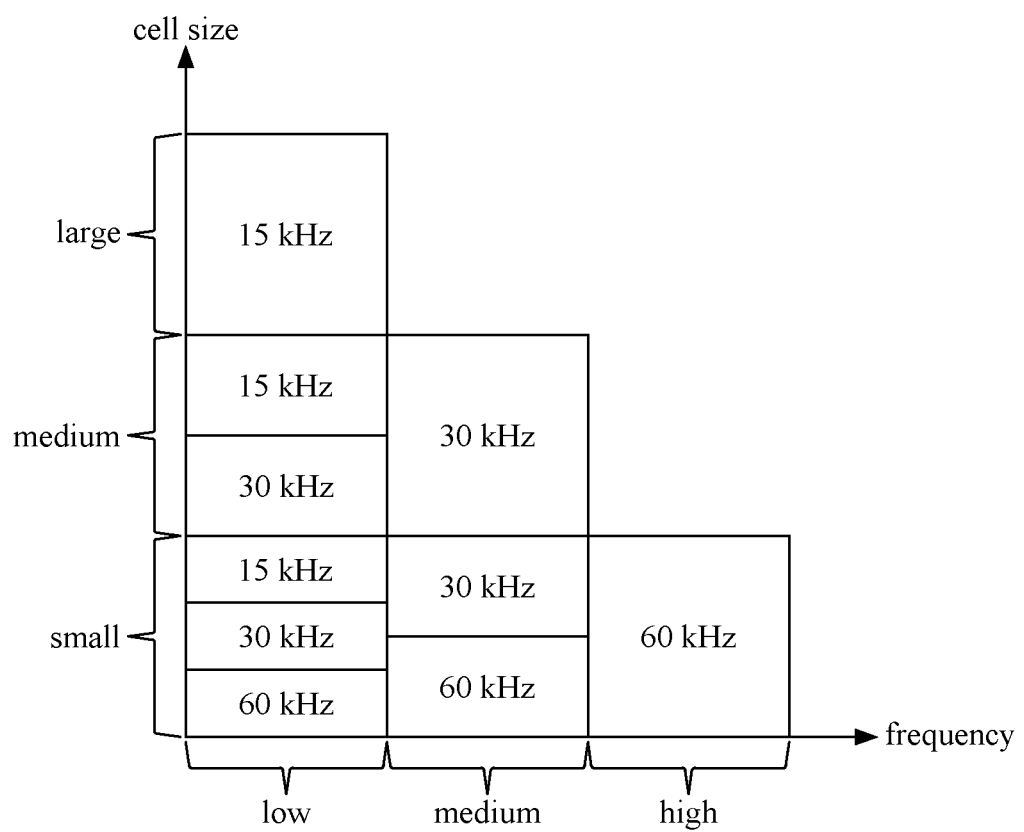
FIG. 4 shows potential carrier spacings with respect to frequency and cell size for 5G radiocommunication systems.

Subcarrier spacings of up to 960 kHz are currently being discussed for NR (the highest discussed values correspond to millimeter-wave based technologies). It was also agreed that multiplexing different numerologies within a same NR carrier bandwidth is supported, and FDM and/or TDM multiplexing can be considered. It was further agreed that multiple frequency/time portions using different numerologies share a synchronization signal, where the synchronization signal refers to the signal itself and the time-frequency resource used to transmit the synchronization signal. Yet another agreement is that the numerology used can be selected independently of the frequency band although it is assumed that a very low subcarrier spacing will not be used at very high carrier frequencies. In FIG. 4, some candidate carrier spacings for NR are illustrated with respect to the frequency and cell size. In Table 1, provided below, further details are provided on corresponding time durations for some candidate carrier spacings. Regardless of the specific selections and values made for NR's numerology related elements, those skilled in the art will appreciate that both the number of numerologies and the dynamic nature in which such numerologies change over time will be significantly greater for NR than for LTE.

Prior to discussing other embodiments herein, some additional terminology is considered.

In some embodiments a non-limiting term "UE" is used. The UE herein can be any type of wireless device capable of communicating with network node or another UE over radio signals. The UE may also be radio communication device, target device, device to device (D2D) UE, machine type UE or UE capable of machine to machine communication (M2M), a sensor equipped with UE, iPAD, tablet, mobile terminals, smart phone, laptop embedded equipped (LEE), laptop mounted equipment (LME), USB dongles, Customer Premises Equipment (CPE) etc.

Also in some embodiments generic terminology "network node", is used. It can be any kind of network node which may comprise a radio network node such as base station (BS), radio base station, base transceiver station, base station controller, network controller, gNB, NR BS, evolved Node B (eNB), Node B, Multi-cell/multicast Coordination Entity (MCE), relay node, access point, radio access point, Remote Radio Unit (RRU) Remote Radio Head (RRH), a multi-standard BS (a.k.a. MSR BS), a core network node (e.g., Mobility Management Entity (MME), Self-Organizing Network (SON) node, a coordinating node, positioning node, Minimum Drive Test (MDT) node, etc.), or even an external node (e.g., 3rd party node, a node external to the current network), etc. The network node may also comprise a test equipment.

The term "radio node" used herein may be used to denote a UE or a radio network node.

In multicarrier or carrier aggregation (CA) operation the UE is able to receive and/or transmit data to more than one serving cells. The term carrier aggregation (CA) is also called (e.g. interchangeably called) "multi-carrier system", "multi-cell operation", "multi-carrier operation", "multi-carrier" transmission and/or reception. In CA one of the component carriers (CCs) is the primary component carrier (PCC) or simply primary carrier or even anchor carrier. The remaining ones are called secondary component carrier (SCC) or simply secondary carriers or even supplementary carriers. The serving cell is interchangeably called as primary cell (PCell) or primary serving cell (PSC). Similarly the secondary serving cell is interchangeably called as secondary cell (SCell) or secondary serving cell (SSC).

In Dual Connectivity (DC) operation the UE can be served by at least two nodes called master eNB (MeNB) and secondary eNB (SeNB). More generally in multiple connectivity (aka multi-connectivity) operation the UE can be served by two or more nodes e.g. MeNB, SeNB1, SeNB2 and so on. The UE is configured with PCC from both MeNB and SeNB. The PCell from MeNB and SeNB are called as PCell and PSCell respectively. The PCell and PSCell operate the UE typically independently. The UE is also configured with one or more SCCs from each of MeNB and SeNB. The corresponding secondary serving cells served by MeNB and SeNB are called SCell. The UE in DC typically has separate TX/RX for each of the connections with MeNB and SeNB. This allows the MeNB and SeNB to independently configure the UE with one or more procedures e.g. radio link monitoring (RLM), DRX cycle etc on their PCell and PSCell respectively. The methods and embodiments described herein are applicable to all of CA, DC and Multi-Connectivity (MC), as well as potentially other types of systems.

The term "signaling" used herein may comprise any of: high-layer signaling (e.g., via RRC or a like), lower-layer signaling (e.g., via a physical control channel or a broadcast channel), or a combination thereof. The signaling may be implicit or explicit. The signaling may further be unicast, multicast or broadcast. The signaling may also be directly to another node or via a third node.

The term "time resource" used herein may correspond to any type of physical resource or radio resource expressed in terms of length of time. Examples of time resources are: symbol, time slot, subframe, radio frame, TTI, interleaving time, etc.

The term "flexible numerology" used herein may refer, e.g., to any one or more of: subcarrier spacing, number of subcarriers per RB, number of RBs within the bandwidth, etc. which can be configured in a flexible way such as changing dynamically and also as numerology was previously described above.

The term "radio measurement" used herein may refer to any measurement performed on radio signals. Radio measurements can be absolute or relative. Radio measurements can be e.g. intra-frequency, inter-frequency, CA, etc. Radio measurements can be unidirectional (e.g., DL or UL) or bidirectional (e.g., round trip time (RTT), Rx-Tx, etc.). Some examples of radio measurements: timing measurements (e.g., time of arrival (TOA), timing advance, RTT, RSTD, SSTD, Rx-Tx, propagation delay, etc.), angle measurements (e.g., angle of arrival), power-based measurements (e.g., received signal power, RSRP, received signal quality, RSRQ, SINR, SNR, CSI, CQI, PMI, interference power, total interference plus noise, RSSI, noise power, etc.), cell detection or identification, beam detection or beam identification, system information reading, RLM, etc.

The term "interruption" or interruption level or interruption performance used herein may correspond to any type of interruption of signals between the UE and the serving cell (e.g. PCell or SCells or PSCell). The interruption leads to loss or degradation of serving cell performance. The interruptions may affect the performance of any one or more serving cells e.g. PCell, PSCell, SCell etc. The loss in serving cell performance or the interruption can be expressed in terms of one or more metrics, which may be absolute or relative, such as error rate or loss of packets or packet loss rate or number of packets lost or packet drop rate or a reduction in the detection probability or an increase of misdetection probability or even probability of missed or dropped or lost packets. The interruption level can be expressed in terms of one or more time resources which are interrupted e.g. interruption time of 1 subframe, 5 subframes, 1 TTI, 2 TTI etc. The packet herein refers to any 'block of data' such as transport block sent over radio interface in UL or DL. The packet loss rate or number of lost packets is typically estimated over certain period of time e.g. measurement time of a radio measurement, pre-defined time etc. In one example the number of lost packets is expressed as total number of missed ACK/NACK in response to continuous transmission of data to the UE from its serving cell over certain time period. In LTE the transmission opportunity or scheduling instance is 1 ms (i.e. 1 TTI). Therefore for example the number of packets lost in LTE is 10 if the UE is unable to transmit 10 ACK/NACK in UL in response to continuous DL transmission over a period of 100 ms. In this example the corresponding packet loss rate is 10% or 0.1. This may also be stated as the probability with which the fraction of ACK/NACK transmitted in the uplink in response to continuous DL transmission over a period are missed or dropped or lost. It may also be expressed as ratio of a/b where:

a is the number of missed ACK/NACK in response to continuous transmission of data to the UE from its serving cell over certain time period (TO); and b is the total number of ACK/NACK in response to continuous transmission of data to the UE from its serving cell if all data blocks are received.

Therefore the serving cell performance (e.g. PCell or SCell or PSCell performance) may also be expressed in terms of the probability of missed ACK/NACK. More specifically it can be expressed as the serving cell interruptions in terms of the probability of missed ACK/NACK. For consistency the term 'serving cell interruption probability of missed ACK/NACK' is used. For interruption on PCell it can be termed as 'PCell interruption probability of missed ACK/NACK'. For interruption on any SCell it can be termed as 'SCell interruption probability of missed ACK/NACK'.

Figure 5:
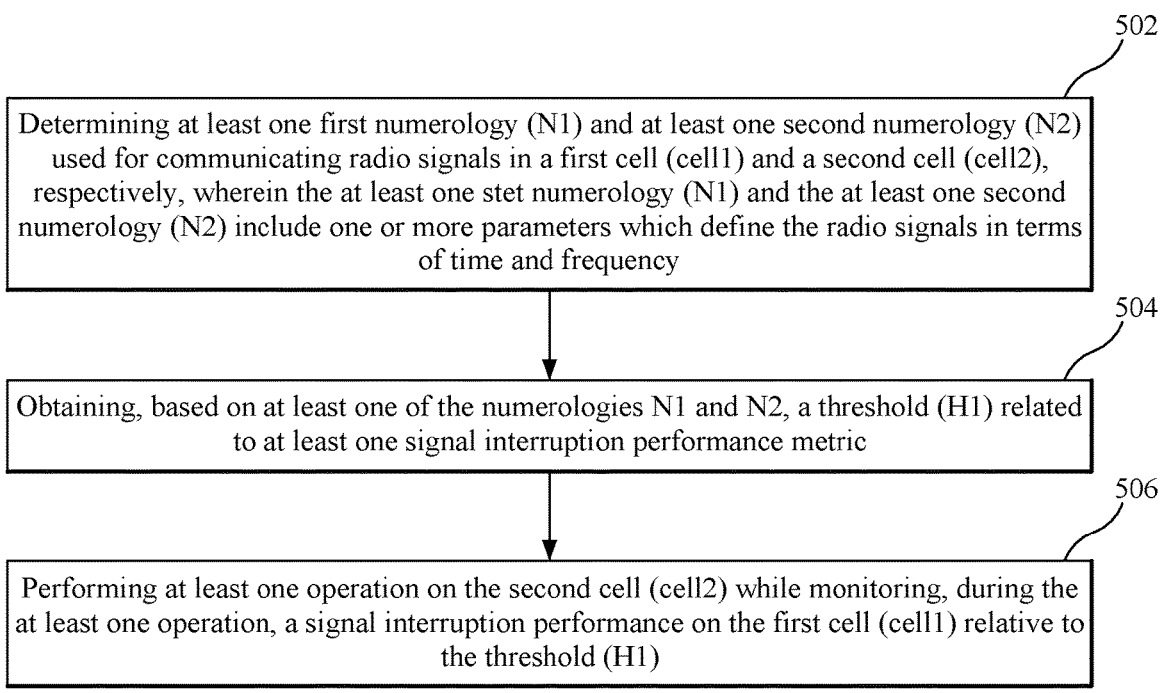
FIGS. 5-7 are flowcharts depicting methods according to various embodiments.

With this terminology in mind, a method embodiment 500 associated with UE operation is illustrated as FIG. 5. Therein, at step 502, the UE determines at least one first numerology N1 and at least one second numerology N2 used for communicating radio signals in a first cell (cell1) and a second cell (cell2), respectively, wherein the at least one first numerology N1 and the at least one second numerology N2 include one or more parameters which define the radio signals in terms of time and frequency, as mentioned above. The UE also obtains, at step 504, a threshold related to at least one signal interruption performance metric based on at least one of the numerologies N1 and N2. The UE performs, at step 506, on the second cell (cell2) while monitoring, during the at least one operation, a signal interruption performance on the first cell (cell1) relative to the threshold (H1). Each of these steps 502-506 will now be discussed in more detail.

In step 502, the UE may determine information related to at least one first numerology (N1) and at least one second numerology (N2) used for operating a first signal and a second signal in a first cell (cell1) and in a second cell (cell2) respectively. In one example the same numerology may be used in both cells i.e. N1=N2. In another example the same numerology may be used in uplink and downlink of the same cell.

In another example different numerologies are used in uplink and downlink of the same cell. In this case the UE may further determine information related to a third numerology (N3) and a fourth numerology (N4) used for operating a first uplink signals (ULS1) and a second uplink signals (ULS2) used in cell1 and cell 2 respectively. In one example N3 and N4 are different. In yet another example N3 and N4 are the same i.e. N3=N4.

Cell1 and cell2 may be operated using carrier frequency #1 (F1) and carrier frequency #2 (F2) respectively. Cell1 and cell2 may also be operated using carrier frequency #1 (F1) and carrier frequency #2 (F2) respectively in the DL and using carrier frequency #3 (F3) and carrier frequency #4 (F4) respectively. In one exemplary implementation F1 and F2 may be the same. In another exemplary implementation F1 and F2 may be different. Also in one exemplary implementation F3 and F4 may be the same. In another exemplary implementation F3 and F4 may be different.

The first DL signal (DLS1) and second DL signal (DLS2) may be transmitted by NW1 and NW2 respectively using numerology #1 (N1) and numerology #2 (N2) respectively. The ULS1 and ULS2 may also be transmitted by the UE using numerology #1 (N1) and numerology #2 (N2) respectively. In yet another example ULS1 and ULS2 may be transmitted by the UE using numerology #3 (N3) and numerology #4 (N4) respectively.

In one exemplary implementation N1 and N2 may be the same. In another exemplary implementation N1 and N2 may be different. Also in one exemplary implementation N3 and N4 may be the same. In another exemplary implementation N3 and N4 may be different. In yet another embodiment, two or more numerologies are used, e.g., multiplexed in time and/or frequency and being dynamically, semi-statically or statically configured or configured based on a pre-defiled rule or scheduling, configured, in at least one of the first and second cells.

The UE may determine the numerologies based on one or more of: stored information in the UE, indication received from a network node, radio measurements performed by the UE etc. The information related to a numerology may comprise, e.g.: subcarrier spacing, time resource length, CP length, number of RBs within a given bandwidth, number of subcarriers per RB, or any combination thereof, etc.

Turning now to step 504 in FIG. 5, the UE may determine at least a first threshold (H1) related to serving cell interruption performance of cell1 based on the determined information about at least one of N1 and N2. The threshold H1 defines a maximum allowed serving cell interruption level on cell1 when the UE performs at least one operation on cell2. Examples of operations on cell2 are configuration, deconfiguration, addition, release, activation, deactivation, measurement etc. An example of H1 is interruption probability of missed ACK/NACK transmitted by the UE corresponding to continuous allocation of DL data on cell1. In another example, H1 is a number of time resources (e.g., subframes the size of which depends on the numerology). In yet another example, H1 is a number of time units (e.g., ms). H1 may also be an absolute number or relative number e.g. with respect to a reference (e.g., pre-defined or configurable), e.g., 5 ms or additional 2 ms with respect to a reference which may be another value e.g. 3 ms.

The UE may further determine a second threshold (H2) related to serving cell interruption performance of cell1 based on the determined information about at least one of N1 and N2. An example of H2 is the maximum number of time resources interrupted on cell1 when the UE performs at least one operation on cell2. Other example interpretations of H2 may be similar to those described for H1. There may also be a pre-defined relation between H1 and H2.

In one example H1 and H2 may be functions of N1 and N2 and can be expressed by the following generalized expressions.

$$H1 = f(N1, N2) \tag{1}$$

$$H2 = f1(N1, N2) \tag{2}$$

In another example H1 and H2 may be functions of N3 and N4 and can be expressed by the following generalized expressions.

$$H1 = f2(N3, N4) \tag{3}$$

$$H2 = f3(N3, N4) \tag{4}$$

In yet another example H1 and H2 may be functions of N1, N2, N3 and N4 and can be expressed by the following generalized expressions.

$$H1=f4(N1,N2,N3,N4) \quad (5)$$

$$H2=f5(N1,N2,N3,N4) \quad (6)$$

In yet another set of examples H1 may be expressed by one of N1, N2, N3 and N4.

In yet another set of examples H2 may be expressed by one of N1, N2, N3 and N4.

In the above, when two or more numerologies are used by at least one of the NW1 and NW2, N1 and/or N2 may be selected from the plurality(-ies) of numerologies used by NW1 and/or NW2 based on a pre-defined rule, e.g., N1 and N2 correspond to the numerologies with the largest subcarrier spacings in NW1 and NW2, respectively. The same principles may apply for N3 and N4.

Examples of values of H1 and H2 as a function of N1 and N2 used in cell1 and cell2 respectively are shown in table 1. In Table 1, in one example, Z3 may be the same as Z1 and Z4 may be the same as Z2; in another example, Z3 may the same as Z2 and Z4 may be the same as Z1; in yet another example, Z3 is different from Z1 and Z2 and/or Z4 is different from Z1 and Z2.

TABLE 1

Values of H1 and H2, as function of numerology used in cell1 and cell2 assuming same numerology N1 in UL and DL of cell1 and N2 in UL and DL of cell2

| No. | Numerology used in cell1 | Numerology used in cell2 | H1 (%) | H2 (number of time resources) |
|---|---|---|---|---|
| 1 | N1 | N1 | X1 | X2 |
| 2 | N2 | N2 | Y1 | Y2 |
| 3 | N1 | N2 | Z1 | Z2 |
| 4 | N2 | N1 | Z3 | Z4 |

Specific examples of magnitude of H1 and H2 as a function of subcarrier spacings used in cell1 and cell2 respectively are shown in Table 2. As shown in Table 2 that larger subcarrier spacings used in the cells results in smaller values of H1 and H2. This is because larger subcarrier spacings lead to short time resource duration (e.g. slot, subframe etc). This leads to finer resolution of interruption duration. In Table 2 the interruption mainly depends on subcarrier spacing of cell1. For example if the operation on cell2 requires a maximum interruption duration of 0.2 ms then the actual interruption on cell1 may be: 1 ms if the subcarrier spacing on cell1 is 15 KHz, 0.5 ms if the subcarrier spacing on cell1 is 30 KHz and even 0.25 ms if the subcarrier spacing on cell1 is 60 KHz.

TABLE 2

Values of H1 and H2, as function of subcarrier used in cell1 and cell2, where the interruption depends on subcarrier spacing of cell1 i.e. serving cell.

| | | | | H2 | |
|---|---|---|---|---|---|
| No. | Subcarrier spacing used in cell1 | Subcarrier spacing used in cell2 | H1(%) | number of interrupted time resources | Interruption time duration (ms) |
| 1 | 15 KHz | 15 KHz | 0.5 | 1 | 1 |
| 2 | 30 KHz | 30 KHz | 0.25 | 1 | 0.5 |
| 3 | 15 KHz | 30 KHz | 0.5 | 1 | 1 |

TABLE 2-continued

Values of H1 and H2, as function of subcarrier used in cell1 and cell2, where the interruption depends on subcarrier spacing of cell1 i.e. serving cell.

| | | | | H2 | |
|---|---|---|---|---|---|
| No. | Subcarrier spacing used in cell1 | Subcarrier spacing used in cell2 | H1(%) | number of interrupted time resources | Interruption time duration (ms) |
| 4 | 30 KHz | 15 KHz | 0.25 | 1 | 0.5 |
| 5 | 60 KHz | 60 KHz | 0.25 | 2 | 0.5 |
| 6 | 60 KHz | 15 KHz | 0.25 | 2 | 0.5 |

In yet another example the interruption level depends on the subcarrier spacing which leads to the largest value of interruption. This is shown in Table 3. For example even if cell1 uses a subcarrier spacing of 60 KHz (e.g. subframe length=0.25 ms) but cell2 uses a subcarrier spacing of 15 KHz (e.g. subframe length=1 ms) then the interruption length is the same as if 15 KHz is used in both cell1 and cell2.

TABLE 3

Values of H1 and H2, as function of subcarrier used in cell1 and cell2 where the interruption depends on subcarrier spacing of the cell which leads to largest value of interruption i.e. either cell1 or cell2

| | | | | H2 | |
|---|---|---|---|---|---|
| No. | Subcarrier spacing used in cell1 | Subcarrier spacing used in cell2 | H1(%) | number of interrupted time resources | Interruption time duration (ms) |
| 1 | 15 KHz | 15 KHz | 0.5 | 1 | 1 |
| 2 | 30 KHz | 30 KHz | 0.25 | 1 | 0.5 |
| 3 | 15 KHz | 30 KHz | 0.5 | 1 | 1 |
| 4 | 30 KHz | 15 KHz | 0.5 | 1 | 1 |
| 5 | 60 KHz | 60 KHz | 0.25 | 2 | 0.5 |
| 6 | 60 KHz | 15 KHz | 0.5 | 1 | 1 |

In yet another example the values of H1 and H2 may be based on N3 e.g. subcarrier spacing used in UL of cell1. In yet another example the values of H1 and H2 may depend on any of N3 and N4 that would lead to the largest value of interruption duration. In yet another example the values of H1 and H2 may depend on any of N1, N2, N3 and N4 that would lead to the largest value of interruption duration.

The UE can determine any of the threshold parameters H1 and H2 at step 504 based on one or more of the following mechanisms:

Pre-defined rule e.g. pre-defined mapping tables 1, 2 and 3;

Information received from a node e.g. from another UE and/or from a network node;

History or statistics; and/or

Recently used values e.g. recent values stored in the memory of the UE.

Turning now to step 506, in this step, the UE may perform one or more operations on cell2. Examples of operations are described above (e.g. configuration, deconfiguration, addition, release, activation, deactivation, measurement, etc.). While performing one or more operations the UE may estimate or determine or observe the value of serving cell interruption. The UE may further compare one or more serving cell interruption performances with their respective thresholds. For example the UE may compare the interruption duration on cell1 with H2. In another example the UE may compare the interruption probability in terms of missed ACK/NACK under continuous DL allocation on cell1 with H1. The UE may adapt one or more procedures to ensure that while performing one or more operations on cell1 the UE does not exceed the estimated serving cell performance with respect to the relevant performance threshold. For example the interruption duration of each interruption on cell1 does not exceed H2, while interruption probability of missed ACK/NACK does not exceed H1 etc. Examples of adaptation of procedure to ensure that the serving cell interruption performance does not exceed their respective thresholds include one or more of:

adapting duration and/or bandwidth of a measurement sample (e.g., a larger bandwidth may require fewer samples to achieve the same accuracy), adapting time used for retuning RF circuitry, adapting frequency or periodicity of obtaining measurement sample, delaying activation or deactivation of cell2, adapting total measurement time and/or the number of samples (e.g., increase the total to reduce a relative interruption impact), and/or adapting the start/pause/resume/stop times of a measurement procedure.

For example if the interruption probability in terms of missed ACK/NACK exceeds H1 then the UE may obtain shorter measurement samples (e.g. 1 ms instead of 2 ms) for doing measurement on cell2.

Figure 6:
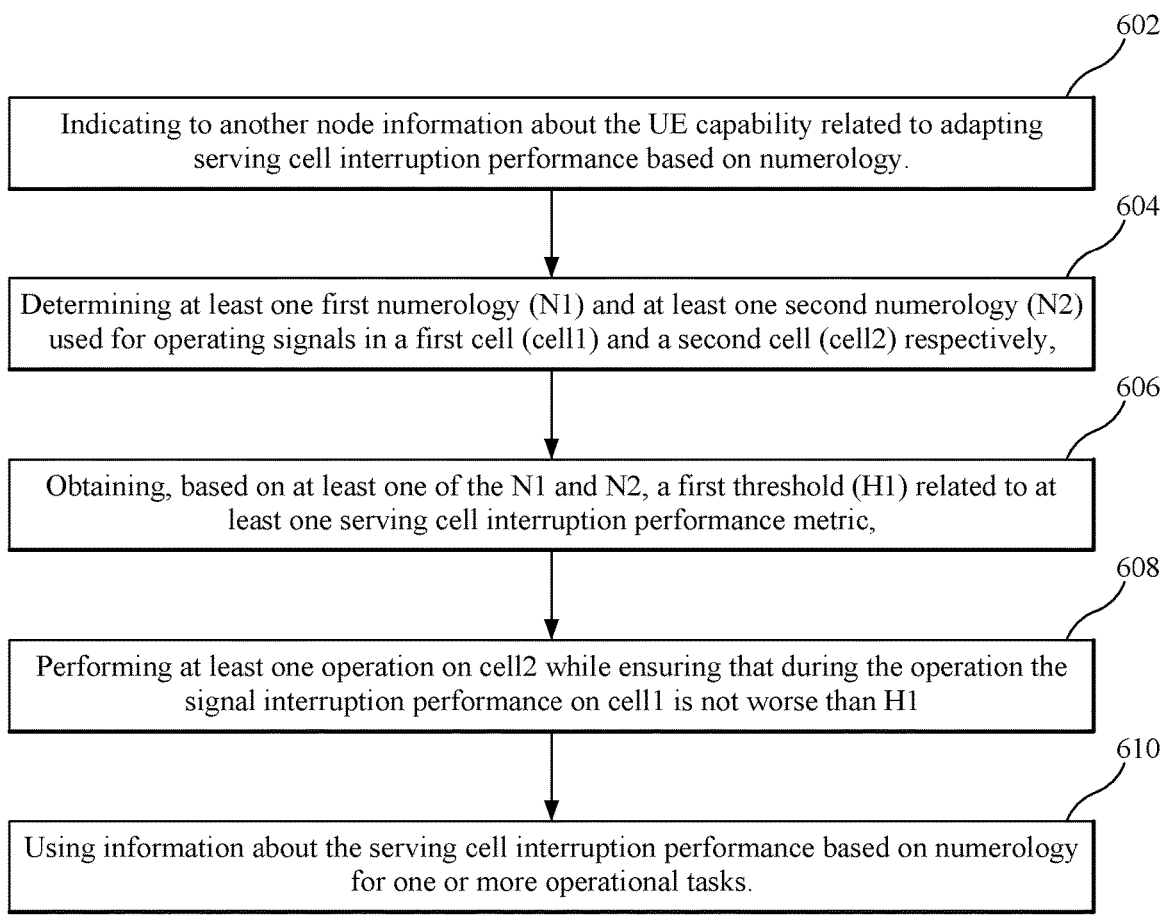

The method embodiment 500 of FIG. 5 can be modified by adding one or more optional steps thereto as shown in the next method embodiment 600 illustrated in FIG. 6. Therein, at step 602, the UE may indicate to another node (e.g., a network node, e.g., radio network node, core network node, positioning node, etc.) information about the UE's capability related to the adaptation of the serving cell interruption performance based on the numerology scenario.

In one example, the capability may comprise the UE's ability to perform according to one or more embodiments described herein.

In another example, the capability may be indicative of the interruptions levels supported by the UE, depending on numerology.

The capability may be sent upon a request from another node or in an unsolicited way, e.g., upon triggering event, condition, receiving a message from another node, etc.

Steps 604, 606, and 608 correspond to variants of steps 502, 504 and 506, respectively, and their detailed description is not repeated here for conciseness.

In step 610, which is optional for the UE, the UE uses the determined or obtained information about the serving cell interruption based on numerology for one or more operational tasks. Examples of such operational tasks are:

adapting measurement sampling for performing radio measurements to reduce or minimize interruption on serving cells, adapting total measurement time and/or the number of samples (e.g., increase the total to reduce a relative interruption impact) on cell1, adapting the start/pause/resume/stop times of a measurement procedure on cell1, adapting measurement configuration (e.g., measurement cycle) of the carrier causing interruptions on serving cell(s), adapting receiver and/or transmitter configurations of the UE. For example the UE may not change the center frequency of its radio transmitter and/or RF bandwidth of its radio transmitter when performing one or more operations. Examples of such operations are performing measurements on cells of deactivated carrier frequency (e.g. f3) causing interruption on the serving cell, and/or post processing data during interruption i.e. using the available processor and memory resources during interruption.

Method embodiments can include one or more of the optional steps 602 and 610. According to an embodiment, a method includes steps 602, 604, 606 and 608. According to another embodiment, a method includes steps 604, 606, 608 and 610.

Thus far embodiments have focused on UE performed methods associated with numerology based serving cell interruption metrics which can be used to control performance of UE operations which cause signaling interruptions. However, other embodiments relate to methods performed in a network node, an example of which is illustrated as method 700 in FIG. 7. The network node can be any of: a first network node (NW1), a second network node (NW2), any other radio network node (e.g. neighbor of NW1 and/or NW2) core network node etc.

Figure 7:
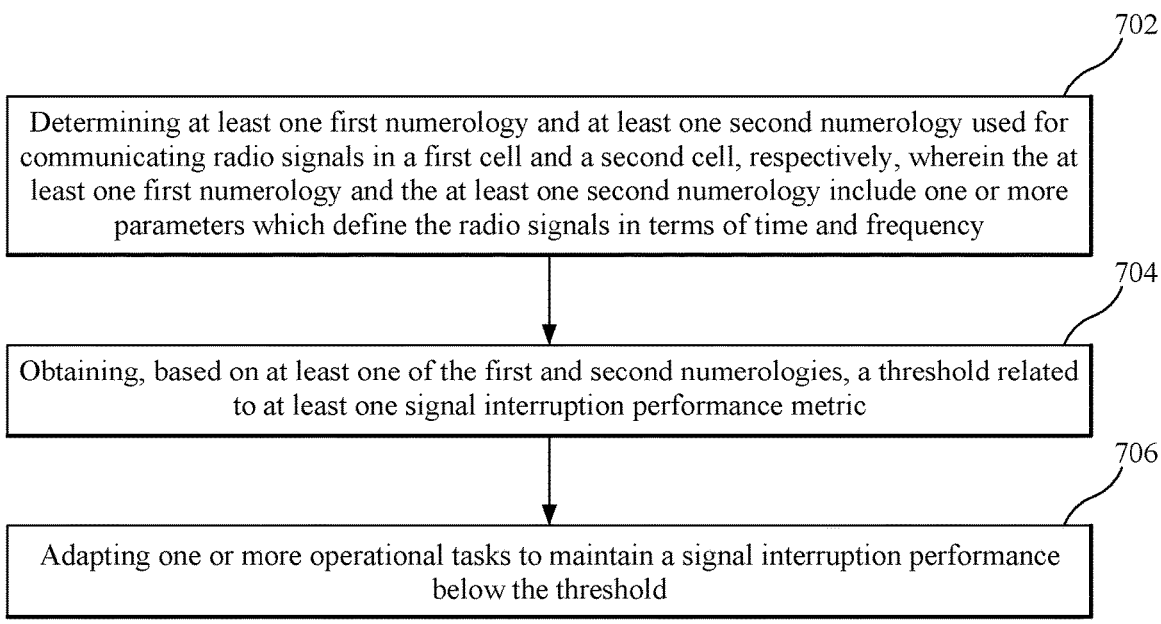

Optionally, and not shown in FIG. 7, the network node may receive from a UE information about the UE's capability related to the adaptation of the serving cell interruption performance based on numerology. The indicated UE capability may further comprise capability of the UE to further adapt the serving cell interruption performance under the flexible numerology scenario.

The obtained capability may further be used by the network node in one or more of the steps below, e.g., the result of a step may be different for a UE with and a UE without such capability.

Referring now to step 702, the network node can determine at least one first numerology and at least one second numerology used for communicating radio signals in a first cell and a second cell, respectively, wherein the at least one first numerology and the at least one second numerology include one or more parameters which define the radio signals in terms of time and frequency. For example, the network node may determine information about at least one first numerology (N1) and at least one second numerology (N2) used for operating DLS1 and DLS2 respectively. The network node may further determine information about a third numerology (N3) and a fourth numerology (N4) used for operating ULS1 and ULS2 respectively. The network node may determine the numerologies based on configuration information sent to the UE by the network node or another node e.g. NW1, NW2 etc.

Referring now to step 706, the network node may determine at least a first threshold (H1) related to serving cell interruption performance of cell1 based on the determined information about at least one of N1 and N2. The threshold H1 defines a maximum allowed serving cell interruption level on cell1 when the UE performs at least one operation on cell2.

The network node may further determine a second threshold (H2) related to serving cell interruption performance of cell1 based on the determined information about at least one of N1 and N2. An example of H2 is the maximum number of time resources interrupted on cell1 when the UE performs at least one operation on cell2.

The network node may determine any of the threshold parameters H1 and H2 based on one or more of the following mechanisms:

pre-defined rule e.g. pre-defined mapping tables 1, 2 and 3 as described above;

information received from another node e.g. from another network node;

history or statistics i.e. values used in the past; and/or recently used values e.g. recent values stored in the memory of the network node.

Looking now to step 706, the network node may adapt one or more procedures to ensure that the signal interruption experience by the UE on cell1 is not worse than H1 when the UE performs at least one operation on cell2. The network node may further adapt one or more procedures to ensure that the signal interruption experience by the UE on cell1 is not worse than H2 when the UE performs at least one operation on cell2.

Examples of adaptation of procedures are:

adaptation of scheduling of data in UL and/or DL on the serving cell of the UE e.g. on cell1. For example not scheduling the UE on cell1 when the UE is performing or is expected to perform operations on cell2;

adaptation of addition or release procedure for cell1. For example the network node may delay in configuring the UE with cell1 or activating cell1 or deactivating cell1 for certain time period;

adapting measurement configuration or measurement performance of measurement performed by the UE on cell2 or on cells belonging to the carrier of cell2. For example configuring the UE to perform measurement on cell2 over larger measurement time;

activating cell2 if the serving cell interruption performance exceed any of thresholds, H1 and H2;

adapting the numerology of cell1 and/or cell2 e.g. adapting any one or more of N1, N2, N3 and N4;

controlling the starting/postponing/delaying/resuming/stopping times for an operation (e.g., measurement, cell identification, RLM, SI reading, etc.) on cell;

controlling the starting/postponing/delaying/resuming/stopping times for an operation (e.g., activation, deactivation, setting up, (de)configuring, measurements, etc.) on cell 2.

Not shown in FIG. 7, the network node can optionally use the information about serving cell interruption performance based on numerology of the UE for one or more operational tasks. Examples of operational tasks are:

reception of signals from the UE e.g. demodulation;

transmission of signals to the UE;

scheduling of signals in UL and/or DL at the UE;

radio measurements;

adaptation of the configuration of measurement gaps;

adaptation of the DRX configuration used for the UE;

adaptation of measurement configuration sent to the UE;

transmitting the determined values of H1 and/or H2 to another network node e.g. neighboring network node, core network node, positioning node etc.

Such embodiments potentially provide a number of advantages or benefits including that (a) multicarrier operation involving different numerologies is enhanced, (b) an interruption level caused by the UE on serving cell under multicarrier operation involving different numerologies is well defined, and/or (c) the methods enable the network node to adapt scheduling and avoid or minimize serving cell interruption when different numerologies are used.

Thusfar the description has focused on methods performed by UEs and network nodes. However other embodiments relate to devices, e.g., UEs and network nodes, e.g., base stations or eNBs, within which such methods can be implemented. Thus, according to some embodiments, the various functions described above can be performed by apparatus which include a module for performing each step or function.

Figure 8:
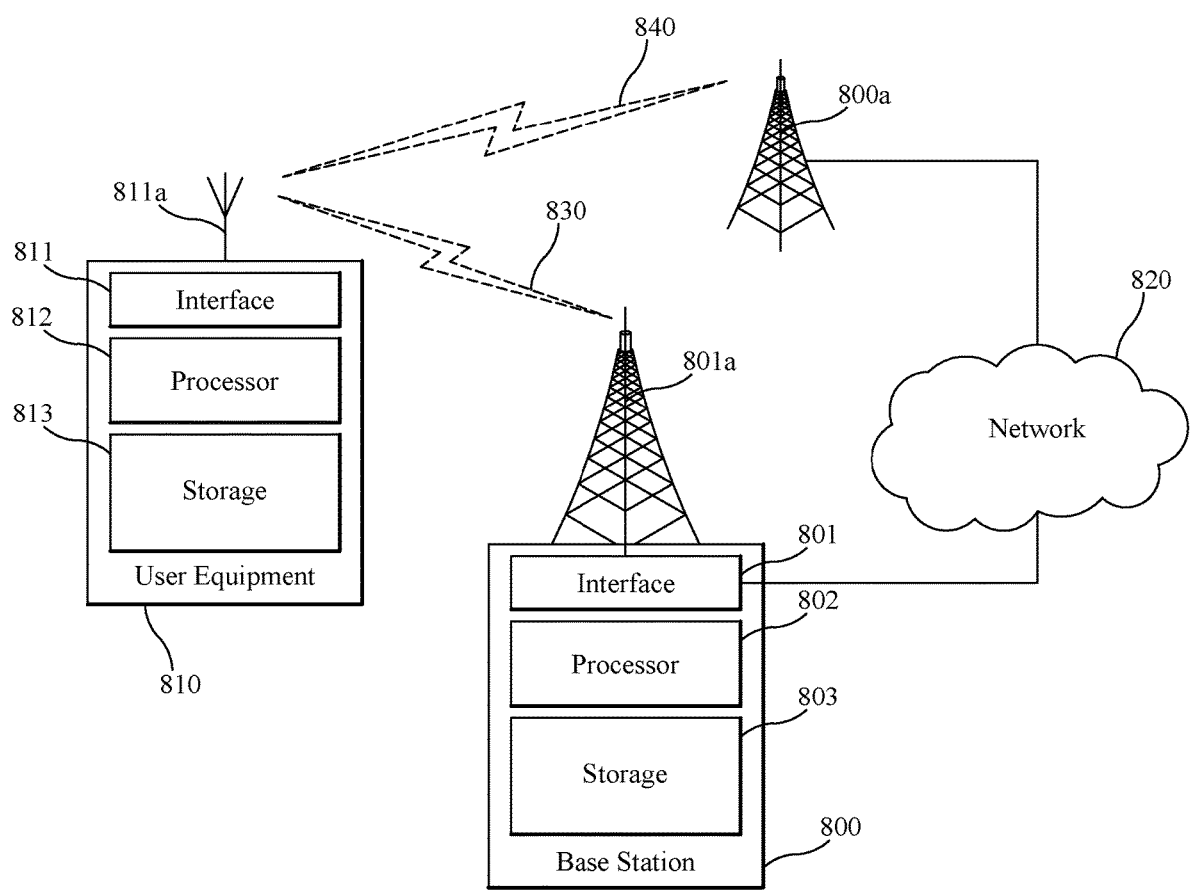
FIG. 8 depicts elements of a radiocommunication system.

As another example of structural embodiments, FIG. 8 illustrates a wireless network comprising a more detailed view of network node 800 and wireless device (WD) 810, in accordance with an embodiment. For simplicity, FIG. 8 only depicts network 820, network nodes 800 and 800*a*, and WD 810, i.e., a UE. Network node 800 comprises processor 802, storage 803, interface 801, and antenna 801*a*. Similarly, WD 810 comprises processor 812, storage 813, interface 811 and antenna 811*a*. These components may work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components that may facilitate or participate in the communication of data and/or signals whether via wired or wireless connections.

Network 820 may comprise one or more IP networks, public switched telephone networks (PSTNs), packet data networks, optical networks, wide area networks (WANs), local area networks (LANs), wireless local area networks (WLANs), wired networks, wireless networks, metropolitan area networks, and other networks to enable communication between devices.

Network node 800 comprises processor 802, storage 803, interface 801, and antenna 801*a*. These components are depicted as single boxes located within a single larger box. In practice however, a network node may comprise multiple different physical components that make up a single illustrated component (e.g., interface 801 may comprise terminals for coupling wires for a wired connection and a radio transceiver for a wireless connection). As another example, network node 800 may be a virtual network node in which multiple different physically separate components interact to provide the functionality of network node 800 (e.g., processor 802 may comprise three separate processors located in three separate enclosures, where each processor is responsible for a different function for a particular instance of network node 800). Similarly, network node 800 may be composed of multiple physically separate components (e.g., a NodeB component or gNB component and a RNC component, a BTS component and a BSC component, etc.), which may each have their own respective processor, storage, and interface components. In certain scenarios in which network node 800 comprises multiple separate components (e.g., BTS and BSC components), one or more of the separate components may be shared among several network nodes. For example, a single RNC may control multiple NodeB's. In such a scenario, each unique NodeB and BSC pair, may be a separate network node. In some embodiments, network node 800 may be configured to support multiple radio access technologies (RATs). In such embodiments, some components may be duplicated (e.g., separate storage 803 for the different RATs) and some components may be reused (e.g., the same antenna 801*a* may be shared by the RATs).

Processor 802 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in conjunction with other network node 800 components, such as storage 803, network node 800 functionality. For example, processor 802 may execute instructions stored in storage 803. Such functionality may include providing various wireless features discussed herein to wireless devices, such as WD 810, including any of the features or benefits disclosed herein.

Storage 803 may comprise any form of volatile or non-volatile computer readable memory including, without limitation, persistent storage, solid state memory, remotely mounted memory, magnetic media, optical media, random access memory (RAM), read-only memory (ROM), removable media, or any other suitable local or remote memory component. Storage 803 may store any suitable instructions, data or information, including software and encoded logic, utilized by network node 800. Storage 803 may be used to store any calculations made by processor 802 and/or any data received via interface 801.

Network node 800 also comprises interface 801 which may be used in the wired or wireless communication of signalling and/or data between network node 800, network 820, and/or WD 810. For example, interface 801 may perform any formatting, coding, or translating that may be needed to allow network node 800 to send and receive data from network 820 over a wired connection. Interface 801 may also include a radio transmitter and/or receiver that may be coupled to or a part of antenna 801a. The radio may receive digital data that is to be sent out to other network nodes or WDs via a wireless connection. The radio may convert the digital data into a radio signal having the appropriate channel and bandwidth parameters. The radio signal may then be transmitted via antenna 801a to the appropriate recipient (e.g., WD 810).

Antenna 801a may be any type of antenna capable of transmitting and receiving data and/or signals wirelessly. In some embodiments, antenna 801a may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line.

WD 810 may be any type of wireless endpoint, mobile station, mobile phone, wireless local loop phone, smartphone, user equipment, desktop computer, PDA, cell phone, tablet, laptop, VoIP phone or handset, which is able to wirelessly send and receive data and/or signals to and from a network node, such as network node 800 and/or other WDs via uplink signals or sidelink signals, respectively. WD 810 comprises processor 812, storage 813, interface 811, and antenna 811a. Like network node 800, the components of WD 810 are depicted as single boxes located within a single larger box, however in practice a wireless device may comprises multiple different physical components that make up a single illustrated component (e.g., storage 813 may comprise multiple discrete microchips, each microchip representing a portion of the total storage capacity).

Processor 812 may be a combination of one or more of a microprocessor, controller, microcontroller, central processing unit, digital signal processor, application specific integrated circuit, field programmable gate array, or any other suitable computing device, resource, or combination of hardware, software and/or encoded logic operable to provide, either alone or in combination with other WD 810 components, such as storage 813, WD 810 functionality. Such functionality may include providing various wireless features discussed herein, including any of the features or benefits disclosed herein.

Storage 813 may be any form of volatile or non-volatile memory including, without limitation, persistent storage, solid state memory, remotely mounted memory, magnetic media, optical media, random access memory (RAM), read-only memory (ROM), removable media, or any other suitable local or remote memory component. Storage 813 may store any suitable data, instructions, or information, including software and encoded logic, utilized by WD 810. Storage 813 may be used to store any calculations made by processor 812 and/or any data received via interface 811.

Interface 811 may be used in the wireless communication of signalling and/or data between WD 810 and network node 800. For example, interface 811 may perform any formatting, coding, or translating that may be needed to allow WD 810 to send and receive data from network node 800 over a wireless connection. Interface 811 may also include a radio transmitter and/or receiver that may be coupled to or a part of antenna 811a. The radio may receive digital data that is to be sent out to network node 801 via a wireless connection. The radio may convert the digital data into a radio signal having the appropriate channel and bandwidth parameters. The radio signal may then be transmitted via antenna 811a to network node 800.

Antenna 811a may be any type of antenna capable of transmitting and receiving data and/or signals wirelessly. In some embodiments, antenna 811a may comprise one or more omni-directional, sector or panel antennas operable to transmit/receive radio signals between 2 GHz and 66 GHz. For simplicity, antenna 811a may be considered a part of interface 811 to the extent that a wireless signal is being used.

Any steps described herein are merely illustrative of certain embodiments. It is not required that all embodiments incorporate all the steps disclosed nor that the steps be performed in the exact order depicted or described herein. Furthermore, some embodiments may include steps not illustrated or described herein, including steps inherent to one or more of the steps disclosed herein.

Any appropriate steps, methods, or functions may be performed through a computer program product that may, for example, be executed by the components and equipment illustrated in the figure above. For example, storage 803 may comprise computer readable means on which a computer program can be stored. The computer program may include instructions which cause processor 802 (and any operatively coupled entities and devices, such as interface 801 and storage 803) to execute methods according to embodiments described herein. The computer program and/or computer program product may thus provide means for performing any steps herein disclosed.

Any appropriate steps, methods, or functions may be performed through one or more functional modules. Each functional module may comprise software, computer programs, sub-routines, libraries, source code, or any other form of executable instructions that are executed by, for example, a processor. In some embodiments, each functional module may be implemented in hardware and/or in software. For example, one or more or all functional modules may be implemented by processors 812 and/or 802, possibly in cooperation with storage 813 and/or 803. Processors 812 and/or 802 and storage 813 and/or 803 may thus be arranged to allow processors 812 and/or 802 to fetch instructions from storage 813 and/or 803 and execute the fetched instructions to allow the respective functional module to perform any steps or functions disclosed herein.

On the contrary, the embodiments are intended to cover alternatives, modifications and equivalents, which are included in the spirit and scope of the invention. Further, in the detailed description of the embodiments, numerous specific details are set forth in order to provide a comprehensive understanding of the claimed invention. However, one skilled in the art would understand that various embodiments may be practiced without such specific details.

Figure 9:
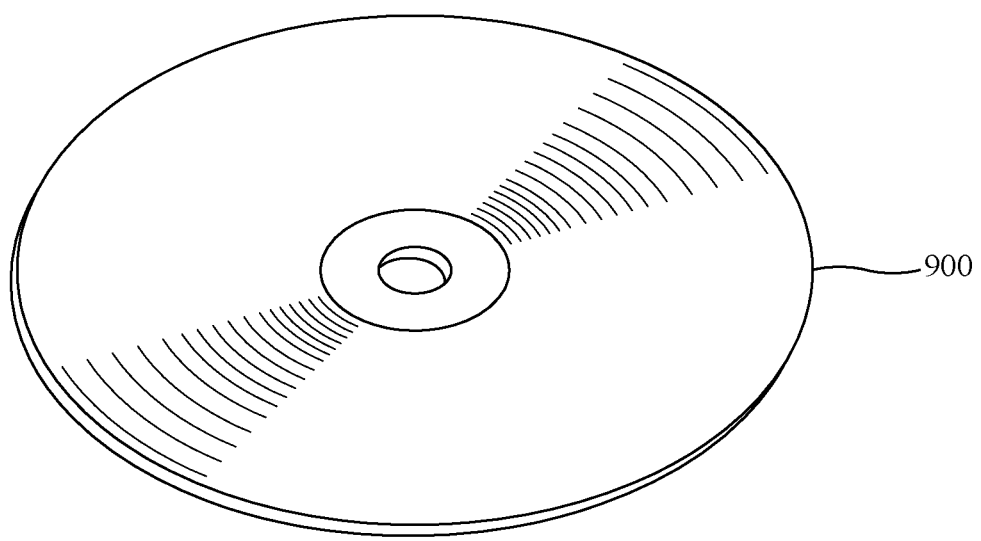
FIG. 9 depicts an electronic storage medium on which computer program embodiments can be stored.

As also will be appreciated by one skilled in the art, the embodiments may take the form of an entirely hardware embodiment or an embodiment combining hardware and software aspects. Further, the embodiments can be implemented using a computer program product stored on a computer-readable storage medium having computer-readable instructions embodied in the medium. Any suitable computer-readable medium may be utilized, including RAM, hard disks, CD-ROMs, digital versatile disc (DVD), optical storage devices, or magnetic storage devices such as floppy disk or magnetic tape, an example of which is provided by medium 900 in FIG. 9. Other non-limiting examples of computer-readable media include flash-type memories or other known memories.

Although the features and elements of the present embodiments are described in the embodiments in particular combinations, each feature or element can be used alone without the other features and elements of the embodiments or in various combinations with or without other features and elements disclosed herein. The methods or flowcharts provided in the present application may be implemented in a computer program, software or firmware tangibly embodied in a computer-readable storage medium for execution by a specifically programmed computer or processor.

What is claimed is:

1. A method of communicating by a user equipment, the method comprising:
    determining at least one first numerology (N1) and at least one second numerology (N2) used for communicating radio signals in a first cell (cell1) and a second cell (cell2), respectively, wherein the at least one first numerology (N1) and the at least one second numerology (N2) include one or more parameters which define the radio signals in terms of time and frequency;
    obtaining, based on at least one of the numerologies N1 and N2, a threshold (H1) related to at least one signal interruption performance metric; and
    performing at least one operation on the second cell (cell2) while monitoring, during the at least one operation, a signal interruption performance on the first cell (cell1) relative to the threshold (H1).

2. A user equipment comprising:
    a processor configured to determine at least one first numerology (N1) and at least one second numerology (N2) used for communicating radio signals in a first cell (cell1) and a second cell (cell2), respectively, wherein the at least one first numerology (N1) and the at least one second numerology (N2) include one or more parameters which define the radio signals in terms of time and frequency, and further configured to obtain, based on at least one of the numerologies N1 and N2, a threshold (H1) related to at least one signal interruption performance metric; and
    a transceiver configured to perform at least one operation on the second cell (cell2),
    wherein the processor is further configured to monitor, during the at least one operation, a signal interruption performance on the first cell (cell1) relative to the threshold (H1).

3. The UE of claim 2, wherein the one or more parameters which define the radio signals in terms of time and frequency includes one or more of: frame duration, subframe or transmission time interval (TTI) duration, slot duration, subcarrier spacing, cyclic prefix (CP) length, number of subcarriers per resource block (RB), and number of RBs within a bandwidth.

4. The UE of claim 2, wherein the transceiver is further configured to transmit a signal toward another node which indicates the UE's capability to adapt its operation related to signal interruption performance based on numerology or which indicates the UE's capability to operate when the numerologies N1 and N2 are different.

5. The UE of claim 2, wherein the processor is further configured to adapt one or more operational tasks when the monitored signal interruption performance exceeds the threshold (H1).

6. The UE of claim 5, wherein the processor is configured to adapt the one or more operational tasks by adjusting one or more parameters associated with taking radio measurement samples.

7. The UE of claim 5, wherein the processor is configured to adapt the one or more operational tasks by adjusting one more receiver and/or transmitter configurations.

8. The UE of claim 2, wherein the signal interruption performance metric can be expressed in terms of any one or more of: one or more interrupted time resources, a number of packets lost over certain time period, a packet loss rate and a number of missed ACK/NACK in response to continuous transmission of data to the UE over a time period.

9. A method of communicating by a network node, the method comprising:
    determining at least one first numerology (N1) and at least one second numerology (N2) used for communicating radio signals in a first cell (cell1) and a second cell (cell2), respectively, wherein the at least one first numerology (N1) and the at least one second numerology (N2) include one or more parameters which define the radio signals in terms of time and frequency;
    obtaining, based on at least one of the numerologies N1 and N2, a threshold (H1) related to at least one signal interruption performance metric; and
    adapting one or more operational tasks to maintain a signal interruption performance below the threshold (H1).

10. A network node comprising:
    a processor configured to determine at least one first numerology (N1) and at least one second numerology (N2) used for communicating radio signals in a first cell (cell1) and a second cell (cell2), respectively, wherein the at least one first numerology (N1) and the at least one second numerology (N2) include one or more parameters which define the radio signals in terms of time and frequency, and configured to obtain, based on at least one of the numerologies N1 and N2, a threshold (H1) related to at least one signal interruption performance metric; and further configured to adapt one or more operational tasks to maintain a signal interruption performance below the threshold (H1).

11. The network node of claim 10, wherein the one or more parameters which define the radio signals in terms of time and frequency includes one or more of:

frame duration, subframe or transmission time interval (TTI) duration, slot duration, subcarrier spacing, cyclic prefix (CP) length, number of subcarriers per resource block (RB), and number of RBs within a bandwidth.

12. The network node of claim 10, further comprising:
a transceiver configured to receive a signal from another node which indicates a user equipment's (UE's) capability to adapt its operation related to signal interruption performance based on numerology or which indicates the UE's capability to operate when the numerologies N1 and N2 are different.

13. The network node of claim 10, wherein the processor is configured to adapt the one or more operational tasks by adjusting scheduling of data in an uplink and/or downlink on a serving cell of a user equipment.

14. The network node of claim 10, wherein the processor is configured to adapt the one or more operational tasks by adjusting addition or release procedures for the first cell (cell1).

15. The network node of claim 10, wherein the processor is configured to adapt the one or more operational tasks by activating the second cell (cell2) if the signal interruption performance exceeds the threshold (H1).

16. The network node of claim 10, wherein the signal interruption performance can be expressed in terms of any one or more of: one or more interrupted time resources, a number of packets lost over certain time period, a packet loss rate and a number of missed ACK/NACK in response to continuous transmission of data to the UE over a time period.

17. A non-transitory computer-readable storage medium containing a computer-readable code that, when read by a computer, causes the computer to perform the steps of:

determining at least one first numerology (N1) and at least one second numerology (N2) used for communicating radio signals in a first cell (cell1) and a second cell (cell2), respectively, wherein the at least one first numerology (N1) and the at least one second numerology (N2) include one or more parameters which define the radio signals in terms of time and frequency;

obtaining, based on at least one of the numerologies N1 and N2, a threshold (H1) related to at least one signal interruption performance metric; and performing at least one operation on the second cell (cell2) while monitoring, during the at least one operation, a signal interruption performance on the first cell (cell1) relative to the threshold (H1).

18. A non-transitory computer-readable storage medium containing a computer-readable code that, when read by a computer, causes the computer to perform the steps of:

determining at least one first numerology (N1) and at least one second numerology (N2) used for communicating radio signals in a first cell (cell1) and a second cell (cell2), respectively, wherein the at least one first numerology (N1) and the at least one second numerology (N2) include one or more parameters which define the radio signals in terms of time and frequency;

obtaining, based on at least one of the numerologies N1 and N2, a threshold (H1) related to at least one signal interruption performance metric; and adapting one or more operational tasks to maintain a signal interruption performance below the threshold (H1).

* * * * *